United States Patent
Kirchberg

[11] Patent Number: 6,134,127
[45] Date of Patent: Oct. 17, 2000

[54] PWM HARMONIC CONTROL

[75] Inventor: Maurice A. Kirchberg, Dubuque, Iowa

[73] Assignee: Hamilton Sunstrand Corporation, Rockford, Ill.

[21] Appl. No.: 08/252,288

[22] Filed: May 18, 1994

[51] Int. Cl.[7] .................................................. H02M 1/12
[52] U.S. Cl. ............................................................. 363/41
[58] Field of Search .............................. 323/282; 363/40, 363/41, 98; 318/811

[56] References Cited

U.S. PATENT DOCUMENTS

| | | | |
|---|---|---|---|
| 4,527,226 | 7/1985 | Glennon | 363/41 |
| 4,961,130 | 10/1990 | Kirchberg, Jr. | 363/41 |
| 4,977,492 | 12/1990 | Kirchberg, Jr. et al. | 363/41 |
| 4,994,956 | 2/1991 | Kirchberg, Jr. et al. | 363/95 |
| 5,001,619 | 3/1991 | Nakajima et al. | 363/41 |
| 5,001,622 | 3/1991 | Kirchberg, Jr. et al. | 363/95 |
| 5,034,876 | 7/1991 | Kirchberg, Jr. et al. | 363/97 |
| 5,043,857 | 8/1991 | Kirchberg, Jr. et al. | 363/41 |
| 5,045,771 | 9/1991 | Kislovski | 323/282 |
| 5,053,939 | 10/1991 | Kirchberg, Jr. et al. | 363/41 |
| 5,327,335 | 7/1994 | Maddali et al. | 363/39 |

*Primary Examiner*—Shawn Riley
*Attorney, Agent, or Firm*—Jeffrey J. Makeever

[57] ABSTRACT

The present invention measures the Fourier coefficients of each controlled harmonic in a signal beginning in a present cycle of the fundamental frequency with a switching angle corresponding to each controlled harmonic and predicts what these Fourier coefficients will be before the occurrence of a corresponding switching angle in a subsequent cycle. The present invention also predicts what these Fourier coefficients would be if the corresponding switching angle in the subsequent cycle is varied. Each switching angle is then varied in the subsequent cycle only if the associated harmonic would be improved thereby; otherwise, that switching angle in not varied in the subsequent cycle.

3 Claims, 6 Drawing Sheets

PWM HARMONIC CONTROL

TECHNICAL FIELD OF THE INVENTION

The present invention relates to the detection of harmonics in a signal and, more particularly, to the detection of harmonics in an inverter signal and to the operation of an inverter so as to control those harmonics in an output of the inverter.

BACKGROUND OF THE INVENTION

The determination of the frequency components of a signal is important in many applications. For example, in an inverter which inverts DC power into AC power, it is typical practice to sense the frequency components of the inverter output in order to operate the inverter so as to control those frequency components. Specifically, it is typical practice to control the first harmonic, i.e. that frequency component having a frequency equal to the fundamental frequency of the inverter output, at a predetermined magnitude and phase, and to control all of the other harmonic components so that they are eliminated from the inverter output.

An inverter is often used in a power conversion system, such as a variable speed, constant frequency (VSCF) power generating system. In a variable speed, constant frequency power generating system, a generator, typically a brushless, three-phase synchronous generator, is operated in a generating mode to convert variable speed motive power supplied by a prime mover into variable frequency AC power. The prime mover may be, for example, a gas turbine engine of an aircraft. The variable frequency AC power produced by the generator is rectified and provided as a DC signal over a DC link to an inverter.

The inverter inverts the DC signal on the DC link into a constant frequency AC inverter output for supply over a load bus to one or more AC loads. The inverter is controlled so that its constant frequency AC output has a desired fundamental frequency. However, the inverter output normally also includes a plurality of harmonics of the fundamental frequency; that is, each such harmonic has a frequency which is an integer multiple of the inverter output fundamental frequency.

Because such harmonics in an inverter output are, generally, undesirable, the inverter is normally controlled so that harmonics of the inverter output fundamental frequency are suppressed or eliminated. In order to control an inverter so as to suppress or eliminate these harmonics, the inverter output is analyzed, normally by a Fourier analysis, in order to determine the harmonic content therein, and the inverter is controlled in response to that harmonic content.

That is, a periodic signal can be represented by an infinite series of trigonometric terms according to the following equation:

$$f(t) = a_0 + a_n \cos(n\omega t) + b_n \sin(n\omega t) \qquad (1)$$

where f(t) is the periodic signal having a fundamental frequency f, $a_0$ is the average, i.e. DC, value of the periodic signal f(t), $a_n$ is the Fourier coefficient corresponding to the cosine component $\cos(n\omega t)$, $b_n$ is the Fourier coefficient corresponding to the sine component $\sin(n\omega t)$, n=1, 2, 3, 4, 5, . . . and is the harmonic number specifying each of the harmonic frequencies in the periodic signal f(t) (the fundamental frequency is considered to be the first harmonic, i.e. n=1), and ω (i.e. 2πf) is the fundamental angular frequency at the fundamental frequency f. The Fourier coefficients $a_n$ and $b_n$ in equation (1) are typically determined by a Fourier analysis. This analysis involves multiplying the signal f(t) by a cosine function (i.e. $\cos(n\omega t)$) having a frequency determined by the harmonic number n and integrating the result over one period of the signal f(t) to determine the Fourier coefficient $a_n$. Similarly, the Fourier coefficient $b_n$ in equation (1) is determined by multiplying the signal f(t) by a sine function (i.e. $\sin(n\omega t)$) having a frequency determined by the harmonic number n and integrating the result over one period of the signal f(t). By setting n=1, 2, 3, 4, 5 . . . , the Fourier coefficients $a_n$ and $b_n$ at the fundamental frequency and each of its harmonics can thus be determined.

Each harmonic can be further specified, if desired, by determining its magnitude and phase. The magnitude of a harmonic is simply the square root of the squares of its corresponding Fourier cosine and sine coefficients. Thus, the magnitude of harmonic n can be determined according to the following equation:

$$mag_n = \sqrt{a_n^2 + b_n^2} \qquad (2)$$

where $mag_n$ is the magnitude of harmonic n, $a_n$ is the Fourier cosine term coefficient in equation (1) for the harmonic n, and $b_n$ is the Fourier sine term coefficient in equation (1) for the harmonic n. The phase of that harmonic is determined by the arc tangent of its corresponding Fourier sine term coefficient divided by its corresponding Fourier cosine term coefficient. Thus, the phase of the harmonic n can be determined by the following equation:

$$pha_n = \tan^{-1} \frac{b_n}{a_n} \qquad (3)$$

where $pha_n$ is the phase of harmonic n, $a_n$ is the Fourier cosine term coefficient in equation (1) for the harmonic n, and $b_n$ is the Fourier sine term coefficient in equation (1) for the harmonic n.

Once the Fourier coefficients of the harmonics components of an inverter signal f(t) have been determined by integrating both $f(t)\sin(n\omega t)$ and $f(t)\cos(n\omega t)$ for each of the harmonics (n=1, 2, 3, 4, 5, . . . ) to be controlled, the inverter can be operated in accordance with these measured coefficients so that the harmonics in the inverter output are controlled at the proper level. That is, the first harmonic, i.e. the harmonic at the fundamental frequency of the inverter output, is controlled at a predetermined set point, and the other harmonics are controlled so that they are eliminated from the inverter output.

One type of inverter, which is controlled in this manner, comprises a plurality of switches which are operated so as to produce PWM pulses. These PWM pulses are supplied to a filter which has a corner frequency selected to remove higher order harmonics. The output of the filter is a sinusoidal waveform the magnitude of which is determined by the width of the PWM pulses. For example, if three PWM pulses are produced by the inverter switches per half-cycle of the output sinusoidal waveform, the magnitude of the output sinusoidal waveform generally can be increased by increasing the width of the pulses, and the magnitude of the output sinusoidal waveform generally can be decreased by decreasing the width of the pulses.

Each PWM pulse has a leading edge and a trailing edge. These edges occur at respective switching angles with respect to a reference point in the sinusoidal waveform cycle. This reference point is usually defined as the point where the sinusoidal waveform crosses the x-axis from negative to positive. The width of the PWM pulse is varied by varying the switching angles. It is also known that the switching angles of the PWM pulses can be controlled in order to reduce the content of the undesired harmonics in the output of the inverter. For example, Glennon discloses, in U.S. Pat. No. 4,527,226, a system in which a plurality of sets of PWM switching angles are stored in a look-up table. Selection logic, in response to certain parameters such as the voltage and current at a point of regulation (POR), selects one of the angle sets for control of the switches of the inverter so as to produce a PWM output having reduced content of the undesired harmonics.

Since the number of sets of switching angles which can be stored in a look-up table are finite, the regulation of the harmonic content in the output of the inverter is limited to the resolution of the look-up table (i.e. the number of stored sets of switching angles). An improved control strategy is implemented by the system disclosed by Kirchberg, et al., U.S. Pat. No. 4,994,956. In this system, an initial switching angle set is selected. The angles in the switching angle set are then adjusted based upon measured harmonic content in the output of the inverter.

These systems are complex and require a substantial amount of processing time. Furthermore, these systems control the switching angles based upon currently measured parameters. However, because the parameters which affect the harmonic content in the output of an inverter are time-variant, the harmonic content in the output of the inverter at the time of measurement may not be the same as the harmonic content in the output of the inverter at the time when the switching angles are adjusted to reduce that measured harmonic content.

SUMMARY OF THE INVENTION

The present invention measures the Fourier coefficients of each controlled harmonic in a signal beginning, in a present cycle of the fundamental frequency, with a switching angle corresponding to each of the controlled harmonics, and predicts what these Fourier coefficients will be before the occurrence of a corresponding switching angle in a subsequent cycle. The present invention also predicts what these Fourier coefficients would be if the corresponding switching angle in the subsequent cycle is varied by a predetermined amount. Each switching angle is then varied in the subsequent cycle only if the associated harmonic would be improved thereby; otherwise, that switching angle is not varied in the subsequent cycle. For example, if varying the first switching angle would result in the first harmonic (i.e. the harmonic having a frequency equal to the fundamental frequency) being controlled closer to the predetermined set point, the first switching angle is varied. If varying the next switching angle would result in the next controllable harmonic being reduced, the next switching angle is varied, and so on.

Therefore, an inverter control system according to one aspect of the invention includes an inverting means for inverting input DC power into output AC power having a fundamental frequency wherein the inverting means produces a variable width pulse and wherein the variable width pulse has a switching angle. A predicting means, connected to the inverting means, predicts a first quantity related to a harmonic of the fundamental frequency if the switching angle is varied, and predicts a second quantity related to the harmonic of the fundamental frequency if the switching angle is unvaried. A means, connected to the inverting means and to the predicting means, controls the inverting means so as to vary the switching angle if the first quantity is closer to a desired level than is the second quantity and so as not to vary the switching angle if the second quantity is closer to a desired level than is the first quantity.

An inverter system according to another aspect of the present invention includes an inverting means for inverting input DC power into output AC power having a fundamental frequency wherein the inverting means produces a variable width pulse and wherein the variable width pulse has a switching angle. A monitoring means, responsive to the inverting means, monitors a harmonic of the fundamental frequency in a present cycle of the output AC power. A predicting means, responsive to the monitoring means, predicts a first quantity related to the harmonic of the fundamental frequency in a subsequent cycle of the output AC power if the switching angle is varied, and predicts a second quantity related to the harmonic of the fundamental frequency in the subsequent cycle of the output AC power if the switching angle is unvaried. A means, connected to the inverting means and responsive to the predicting means, controls the inverting means so as to vary the switching angle in the subsequent cycle of the output AC power if the first quantity is closer to a desired level than is the second quantity and so as not to vary the switching angle in the subsequent cycle of the output AC power if the second quantity is closer to a desired level than is the first quantity.

In accordance with a further aspect of the present invention, an inverter system includes an inverting means for inverting input DC power into output AC power having a fundamental frequency wherein the inverting means produces a variable width pulse, wherein the variable width pulse has a switching angle in a present cycle of the output AC power, and wherein the inverting means has an inverter signal. An integrating means integrates, beginning at the switching angle in a present cycle of the output AC power, a product of the inverter signal and a sine function to produce a first integrated quantity wherein the sine function has a frequency of a harmonic of the fundamental frequency, and integrates, beginning at the switching angle in the present cycle of the output AC power, a product of the inverter signal and a cosine function to produce a second integrated quantity wherein the cosine function has the frequency of the harmonic of the fundamental frequency. A predicting means, responsive to the integrating means, predicts varied first and second integrated quantities in a subsequent cycle of the output AC power if the switching angle is varied, and predicts unvaried first and second integrated quantities in the subsequent cycle of the output AC power if the switching angle is unvaried. A means, connected to the inverting means and responsive to the predicting means, controls the inverting means so as to vary the switching angle in the subsequent cycle of the output AC power if the varied first and second integrated quantities are each closer to a desired level than are the unvaried first and second integrated quantities, and so as not to vary the switching angle in the subsequent cycle of the output AC power if the unvaried first and second integrated quantities are each closer to a desired level than are the varied first and second integrated quantities.

In accordance with yet another aspect of the present invention, an inverter system includes an inverting means for inverting input DC power into output AC power having a fundamental frequency wherein the inverting means produces a variable width pulse, wherein the variable width pulse has a switching angle in a present cycle of the output AC power, and wherein the inverting means has an inverter signal. An integrating means integrates a product of the inverter signal and a sine function to produce a first integrated quantity wherein the sine function has a frequency of a harmonic of the fundamental frequency, and integrates a product of the inverter signal and a cosine function to produce a second integrated quantity wherein the cosine function has the frequency of the harmonic of the fundamental frequency. A predicting means, responsive to the integrating means, predicts varied first and second integrated quantities in a subsequent cycle of the output AC power if the switching angle is varied, and predicts unvaried first and second integrated quantities in the subsequent cycle of the output AC power if the switching angle is unvaried. A means, connected to the inverting means and responsive to the predicting means, controls the inverting means so as to vary the switching angle in the subsequent cycle of the output AC power if the varied first and second integrated quantities are each closer to a desired level than are the unvaried first and second integrated quantities, and so as not to vary the switching angle in the subsequent cycle of the output AC power if the unvaried first and second integrated quantities are each closer to a desired level than are the varied first and second integrated quantities.

An inverter system according to yet another aspect of the invention includes an inverting means for inverting input DC power into output AC power having a fundamental frequency wherein the inverting means produces a variable width pulse, wherein the variable width pulse has a switching angle, and wherein the inverting means has an inverter signal. An integrating means integrates, beginning in a present cycle of the output AC power, a product of the inverter signal and a sine function to produce a first integrated quantity wherein the sine function has a frequency of a harmonic of the fundamental frequency, and integrates, beginning in a present cycle of the output AC power, a product of the inverter signal and a cosine function to produce a second integrated quantity wherein the cosine function has the frequency of the harmonic of the fundamental frequency. A predicting means, responsive to the integrating means, predicts varied first and second integrated quantities in a subsequent cycle of the output AC power if the switching angle is varied, and predicts unvaried first and second integrated quantities in the subsequent cycle of the output AC power if the switching angle is unvaried. A means, connected to the inverting means and responsive to the predicting means, controls the inverting means so as to vary the switching angle in the subsequent cycle of the output AC power if the varied first and second integrated quantities are each closer to a desired level than are the unvaried first and second integrated quantities, and so as not to vary the switching angle in the subsequent cycle of the output AC power if the unvaried first and second integrated quantities are each closer to a desired level than are the varied first and second integrated quantities.

An apparatus in accordance with yet a further aspect of the invention includes an inverting means for inverting DC power into AC power having a fundamental frequency wherein the inverting means has an inverter signal, wherein the inverting means produces a variable width pulse, and wherein the variable width pulse occurs between first and second switching angles. A sensing means connected to the inverting means senses an inverter signal of the inverting means. A predicting means responsive to the sensing means predicts a first quantity related to a harmonic of the fundamental frequency in the output AC power if the first switching angle is varied, and predicts a second quantity related to the harmonic of the fundamental frequency in the output AC power if the first switching angle is unvaried. A controlling means responsive to the predicting means and connected to the inverting means controls the inverting means so as to vary the first switching angle if the first quantity is closer to a desired level than is the second quantity and so as not to vary the first switching angle if the second quantity is closer to a desired level than is the first quantity.

BRIEF DESCRIPTION OF THE DRAWING

These and other features and advantages will become more apparent from a detailed consideration of the invention when taken in conjunction with the drawing in which.

DETAILED DESCRIPTION

Figure 1:
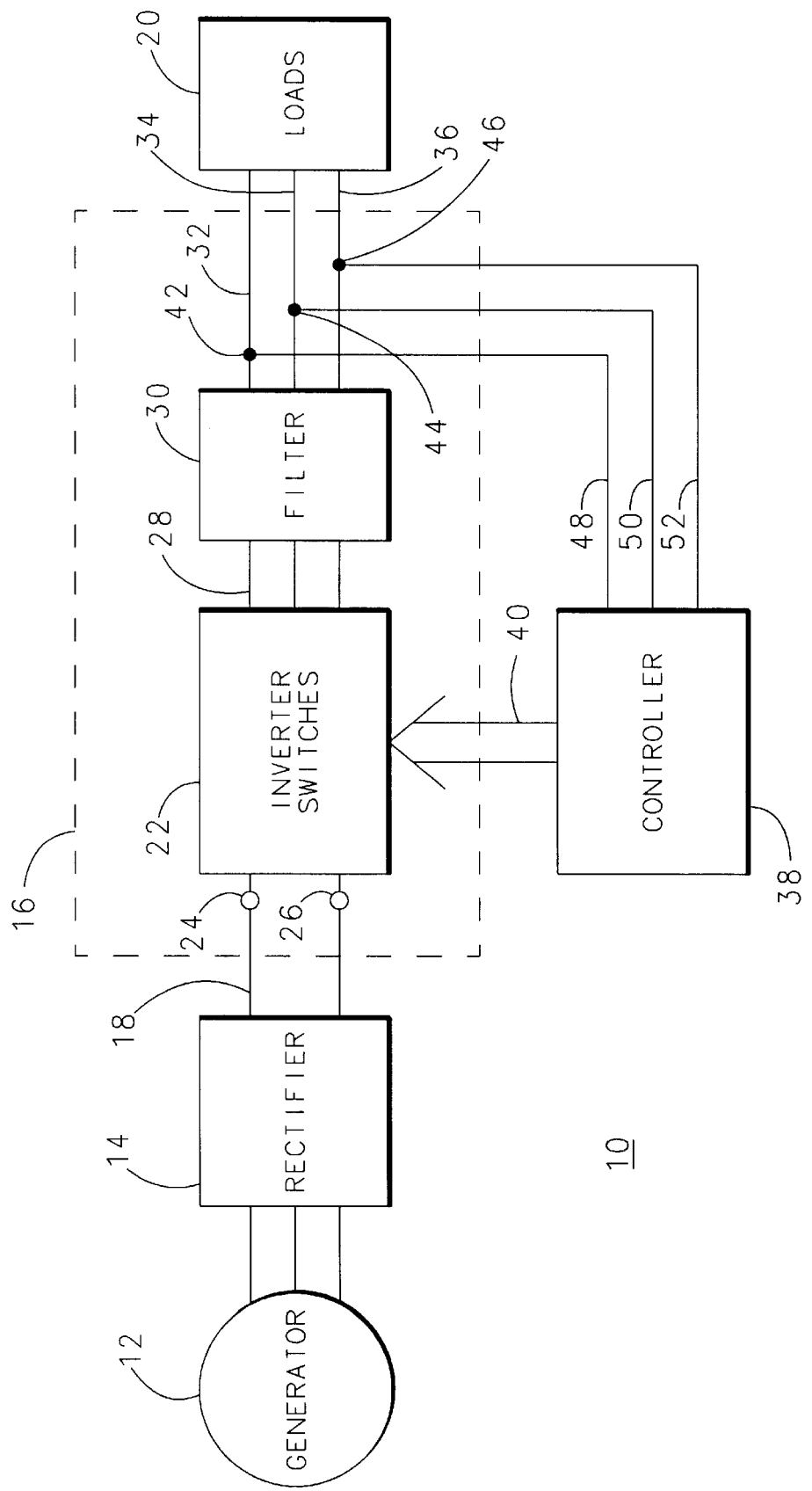
FIG. 1 is a block diagram illustrating the inverter system according to the present invention.

In FIG. 1, an inverter system 10 includes a generator 12 which may be, for example, driven by a variable speed prime mover such as the turbine engine of an aircraft. The generator 12 has a three phase output which, if the generator 12 is driven by a variable speed prime mover, carries wild frequency AC power. A rectifier 14 rectifies the wild frequency AC power from the generator 12 into DC power and supplies this DC power to an inverter 16 which inverts this DC power to constant frequency, sinusoidal AC power to be supplied to AC loads 20.

The inverter 16 includes a DC link 18 which receives the DC power from the output of the rectifier 14, and inverts this DC power to constant frequency, sinusoidal AC power for supply to AC loads 20. Inverter switches 22 of the inverter 16 switch the DC power on the DC link 18 in order to produce AC power. The inverter switches 22 include a pair of input terminals 24 and 26 which are connected to the DC link 18. The terminal 24 is connected to a positive rail of the DC link 18, and the terminal 26 is connected to a negative rail of the DC link 18. Typically, the inverter switches 22 are operated in a manner so that they chop the DC power on the DC link 18 into pulse width modulated pulses.

These pulses are supplied over an inverter output 28 to a filter 30 which suppresses higher order harmonics in the output of the inverter switches 22 and which produces three phase, constant frequency sinusoidal AC power for supply to the AC loads 20. (Since filters capable of filtering the lower order harmonics, such as the third and the fifth harmonics, are massive and expensive, the inverter switches 22 are typically controlled in such a fashion that they suppress these lower order harmonics.) Accordingly, an output line 32 of the filter 30 carries a first phase of the sinusoidal AC power to the AC loads 20, an output line 34 carries a second phase of the sinusoidal AC power to the AC loads 20, and an output line 36 carries a third phase of the sinusoidal AC power to the AC loads 20.

A controller 38, through an output 40, controls the inverter switches 22 so as to regulate the phase of the PWM pulses provided by the inverter switches 22 over the inverter output 28. In performing its control functions, the controller 38 responds to the voltage on the output line 32 of the filter 30 at a junction 42, to the voltage on the output line 34 of the filter 30 at a junction 44, and to the voltage on the output line 36 of the filter 30 at a junction 46. The junction 42 is connected to the controller 38 by way of a first line 48, the junction 44 is connected to the controller 38 by way of a second line 50, and the junction 46 is connected to the controller 38 by way of a third line 52.

Figure 2:
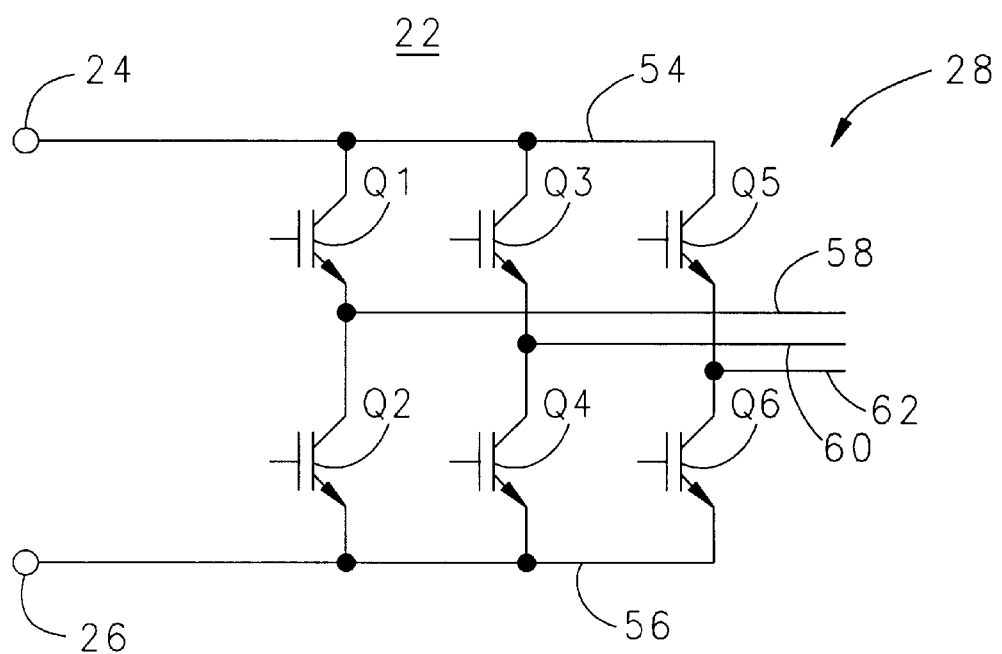
FIG. 2 illustrates the inverter switches of FIG. 1 in greater detail.

The inverter switches 22 are shown in greater detail in FIG. 2. The inverter switches 22 include a plurality of insulated gate, bi-polar transistors Q1–Q6 connected between a positive rail 54 and a negative (or return) rail 56. The positive rail 54 is connected to the terminal 24, and the negative rail 56 is connected to the terminal 26. The collectors of transistors Q1, Q3, and Q5 are connected to the positive rail 54 and the emitters of transistors Q2, Q4, and Q6 are connected to the negative rail 56. The junction of the emitter of the transistor Q1 and the collector of the transistor Q2 is connected to a first phase output line 58 of the inverter output 28, the junction of the emitter of the transistor Q3 and the collector of the transistor Q4 is connected to a second phase output line 60 of the inverter output 28, and the junction of the emitter of the transistor Q5 and the collector of the transistor Q6 is connected to a third phase output line 62 of the inverter output 28.

The gates of the transistors Q1–Q6 are connected to the output 40 of the controller 38 and are controlled thereby in order to produce three phase, PWM switching patterns on the output lines 58, 60, and 62 so that these three phase, PWM switching patterns are separated in phase with respect to one another by 120°. Thus, the switching pattern on the second phase output line 60 is displaced in phase by 120° from the switching pattern on the first phase output line 58, and the switching pattern on the third phase output line 62 is displaced in phase by 120° with respect to the switching pattern on the second phase output line 60 and by 240° with respect to the switching pattern on the first phase output line 58. Furthermore, the controller 38, as is known, may control the transistors Q1 and Q2 so that they are not conducting at the same time, may control the transistors Q3 and Q4 so that they are not conducting at the same time, and may control the transistors Q5 and Q6 so that they are not conducting at the same time; short circuit conditions are thereby avoided. As is also known, the controller 38 may control the transistors Q1–Q6 so that, once gated on, each transistor conducts for at least the minimum "on-time" of such transistors; damage or destruction of these transistors is thereby avoided.

Figure 3:
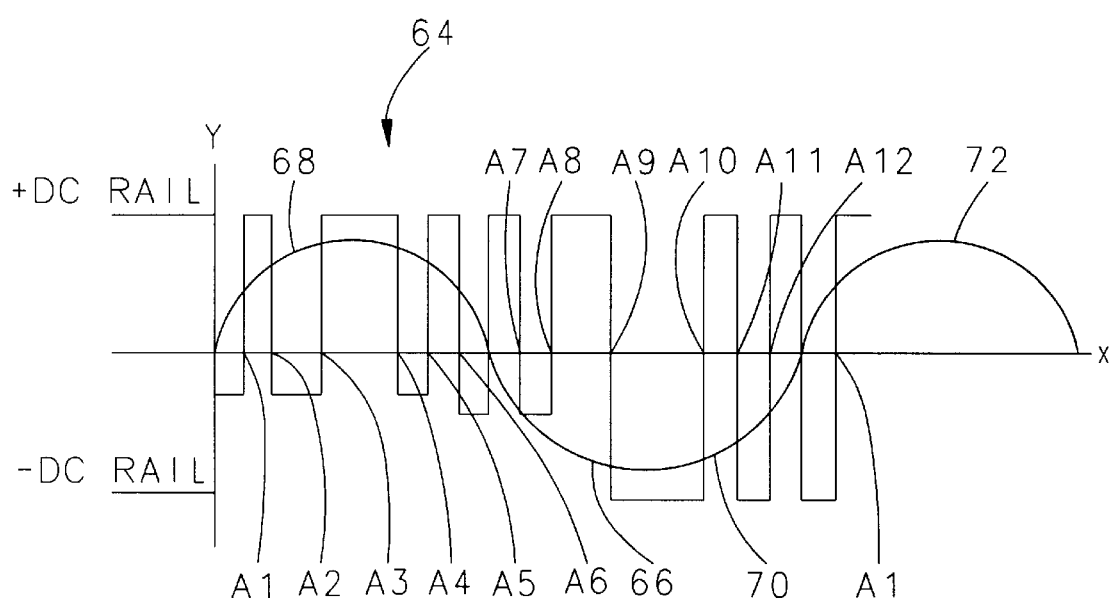
FIG. 3 illustrates examples of PWM pulses produced by the inverter switches shown in FIG. 2.

A representative PWM switching pattern 64 for one of the phases on one of the corresponding output lines 58, 60, or 62 is shown in FIG. 3. The PWM switching pattern 64 is shown having six PWM pulses and twelve corresponding switching angles (i.e. phase angles) $A_1$–$A_{12}$ during a cycle of the resulting output AC. However, any other suitable number of PWM pulses and corresponding switching angles may be used.

To produce the pulses shown in FIG. 3, the transistor Q1 is turned on and the transistor Q2 is turned off at the switching angle $A_1$ thereby pulling the output line 58 to the positive DC rail 54. The transistor Q1 is then turned off and the transistor Q2 is turned on at the switching angle $A_2$ to pull the output line 58 to the negative DC rail 56. The transistor Q1 is then turned on and the transistor Q2 is turned off at the switching angle $A_3$ to pull the output line 58 to the positive DC rail 54, and so on to produce the PWM switching pattern 64.

As a result of the PWM switching pattern 64 on the output line 58, an AC sinusoidal output 66 will be produced on the output line 32 between the filter 30 and the AC loads 20. This AC sinusoidal output 66 will have a positive half cycle 68 controlled by the switching angles $A_1$–$A_6$ and a negative half cycle 70 controlled by the switching angles $A_7$–$A_{12}$. As shown in FIG. 3, the PWM pulses between the switching angles $A_7$–$A_{12}$ are substantially the inverse of the PWM pulses between the switching angles $A_1$–$A_6$, although this inverse relationship is not critical and may be dispensed with if each of the switching angles $A_1$–$A_{12}$ is to be independently controlled.

For example, if the controller 38 is arranged to respond to harmonic ripple on the DC link 18 instead of to the harmonic content on output lines 32, 34, and 36 as shown, both even and odd harmonics may be present on the DC link 18. If so, it may be necessary to control all of the switching angles $A_1$–$A_{12}$ independently. However, if the controller 38 is arranged to respond to the harmonic content on the output lines 32, 34, and 36, half-wave or quarter-wave symmetry may be used to control the switching angles $A_1$–$A_{12}$. In half-wave symmetry, for example, the switching angle $A_1$ is controlled independently, but the switching angle $A_7$ is controlled as a function of the switching angle $A_1$. Accordingly, the phase difference between the switching angle $A_7$ and the switching angle $A_1$ is 180°. Similarly, the phase difference between the switching angle $A_8$ and the switching angle $A_2$ is 180°, and so on. Thus, once the switching angles $A_1$–$A_6$ have been determined by the controller 38, the switching angles $A_7$–$A_{12}$ automatically follow. On the other hand, if the PWM switching pattern 64 is controlled to have quarter-wave symmetry, the switching angles $A_1$–$A_3$ are determined independently; the switching angles $A_4$–$A_6$ are controlled dependently. That is, the switching angles $A_4$–$A_6$ are the mirror images of the switching angles $A_1$–$A_3$. For quarter-wave symmetry, the switching angle $A_6$ is 180° minus the switching angle $A_1$. The switching angle pairs $A_2/A_5$ and $A_3/A_4$ are similarly controlled. The switching angles $A_7$–$A_{12}$ are the inverse of the switching angles $A_1$–$A_6$.

Generally, there is a correlation between the number of switching angles which are independently controlled and the number of harmonics which can be regulated by adjusting those switching angles. If it is desired to control a greater number of harmonics, the number of independently controlled switching angles, and thereby the number of pulses in the PWM switching pattern 64, must be also increased. Thus, if the inverter switches 22 are controlled for half-wave symmetry, then all of the switching angles $A_1$–$A_6$ may be adjusted to control the harmonic content in the output of the inverter 16. That is, by properly controlling these switching angles, the first harmonic (i.e. the harmonic having a frequency equal to the fundamental frequency of the inverter 16) can be controlled at a desired magnitude and phase, and five other selected harmonics can be controlled so that they are eliminated from the output of the inverter 16.

Figure 4:
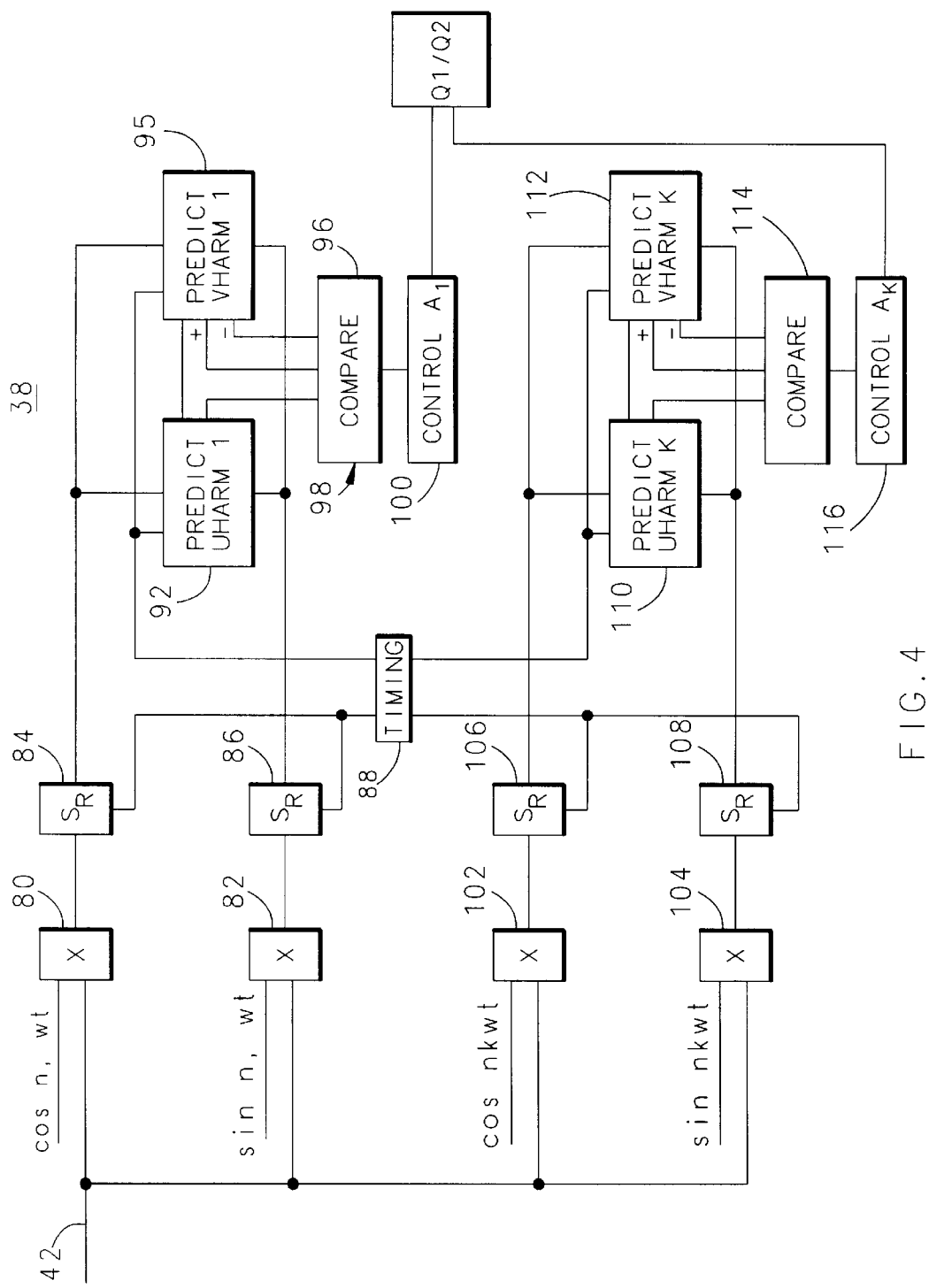
FIG. 4 illustrates one embodiment of the controller of FIG. 1.

One embodiment of the controller 38 is shown in FIG. 4. As shown in FIG. 4, the controller 38 is arranged to control only one of the phases of the output of the inverter switches 22, it being understood that two other arrangements, such as the one shown in FIG. 4, are required for the control of the other two phases of the output of the inverter switches 22.

As shown in FIG. 4, the sensing terminal 42 is connected to one input of a multiplier 80. The other input of the multiplier 80 receives a cosine signal having a frequency equal to the frequency of the first controlled harmonic $n_1$. In this case, the first controlled harmonic may have a frequency equal to the fundamental frequency of the output of the inverter 16. Similarly, the sensing terminal 42 is also connected to one input of a multiplier 82, the other input of which receives a sine signal having a frequency equal to the frequency of the first controlled harmonic $n_1$.

The output of the multiplier 80 is connected to an integrator 84, and the output of the multiplier 82 is connected to an integrator 86. A timing controller 88 such as a clock, synchronized to the PWM pulse pattern 64, resets the integrators 84 and 86 at the first switching angle $A_1$ of a present cycle 68 (FIG. 3) of the sinusoidal waveform 66 to be produced by the inverter 16. The integrator 84 integrates the product of the signal on line 32 and the cosine function having a frequency equal to the frequency of the first controlled harmonic $n_1$ to produce a first integrated quantity; that is, the integrator 84 integrates $f(t)\cos(n_1\omega t)$ where $f(t)$ is the signal on line 32, and $\cos(n_1\omega t)$ is the cosine function having the frequency equal to the frequency of the first controlled harmonic $n_1$. The integrator 86 integrates the product of the signal on line 32 and the sine function having a frequency equal to the frequency of the first controlled harmonic $n_1$ to produce a second integrated quantity; that is, the integrator 86 integrates $f(t)\sin(n_1\omega t)$ where $f(t)$ is the signal on the line 32, and $\sin(n_1\omega t)$ is the sine function having the frequency equal to the frequency of the first controlled harmonic $n_1$. In response to the timing controller 88, the integrator 84 begins the integration of $f(t)\cos(n_1\omega t)$ at the first switching angle $A_1$ of the present cycle 68, and the integrator 86 begins the integration of $f(t)\sin(n_1\omega t)$ also at the first switching angle $A_1$ of the present cycle 68.

The outputs from the integrators 84 and 86 are connected to a first predictor 92. At a predetermined point in the sinusoidal waveform 66 before the sinusoidal signal 66 reaches the switching angle $A_1$ in a subsequent cycle 72 of the sinusoidal waveform 66, the first predictor 92 predicts an unvaried harmonic, i.e. the first predictor 92 predicts what the magnitude and phase of the harmonic $n_1$ will be when the sinusoidal waveform 66 reaches the unvaried switching angle $A_1$ in the subsequent cycle 72.

Specifically, the output of the integrator 84 is the Fourier cosine term coefficient (i.e., $a_{n1}$) associated with the harmonic $n_1$ in the signal on the output line 32, and the output of the integrator 86 is the Fourier sine term coefficient (i.e., $b_{n1}$) associated with the harmonic $n_1$ in the signal on the output line 32. Since the harmonic $n_1$ has the shape of a standard sinusoidal waveform, the predictor 92 predicts $a_{n1}$ and $b_{n1}$ by projecting the outputs from the integrators 84 and 86 along a standard sinusoidal waveform from the phase angle where it stops the integration process (i.e. at the point where the prediction is made) to the phase angle corresponding to the unvaried switching angle $A_1$ in the subsequent cycle 72. (Alternatively, a straight line from the phase angle where the integrators 84 and 86 stop the integration process to the phase angle corresponding to the switching angle $A_1$ can be used to make this prediction.)

From these predicted values of $a_{n1}$ and $b_{n1}$, the predicted magnitude and phase of the harmonic $n_1$ can be determined. The predicted magnitude of the harmonic $n_1$ can be determined by the following equation:

$$mag_{n1} = \sqrt{a_{n1}^2 + b_{n1}^2} \qquad (4)$$

where $mag_{n1}$ is the predicted magnitude of the harmonic $n_1$, $a_{n1}$ is the predicted Fourier cosine term coefficient based upon the output from the integrator 84 for the harmonic $n_1$, and $b_{n1}$ is the predicted Fourier sine term coefficient based upon the output from the integrator 86 for the harmonic $n_1$.

The predicted phase of the harmonic $n_1$ can be determined by the following equation:

$$pha_{n1} = \tan^{-1}\frac{b_{n1}}{a_{n1}} \qquad (5)$$

where $pha_{n1}$ is the predicted phase of harmonic $n_1$, $a_{n1}$ is the predicted Fourier cosine term coefficient based upon the output from the integrator 84 for the harmonic $n_1$, and $b_{n1}$ is the predicted Fourier sine term coefficient based upon the output from the integrator 86 for the harmonic $n_1$.

Similarly, the outputs from the integrators 84 and 86 are connected to a second predictor 95. At the same predetermined point in the sinusoidal waveform 66 at which the first predictor 92 predicts $a_{n1}$ and $b_{n1}$ for the unvaried switching angle $A_1$, the second predictor 95 predicts what $a_{n1}$ and $b_{n1}$ of the harmonic $n_1$ would be if the switching angle $A_1$ in the subsequent cycle 72 is advanced and retarded by a predetermined amount of phase. That is, the second predictor 95 predicts $a_{n1}^-$ and $b_{n1}^-$ by projecting the outputs from the integrators 84 and 86 along a standard sinusoidal waveform from the phase angle at which the prediction is made to the switching angle $A_1$ to determine $a_{n1}$, and by adding to $a_{n1}$ the harmonic content due to an incremental change in switching angle from the switching angle $A_1$ to the advanced (i.e., earlier) switching angle $A_1^-$.

That is, the first predictor 92 predicted the Fourier coefficient $a_{n1}$ as a result of not changing the switching angle $A_1$ in the subsequent cycle 72. The second predictor 95 predicts the incremental change in the Fourier coefficient $a_{n1}$, i.e. $a_{n1\Delta}^-$, which results if the switching angle $A_1$ is advanced to the switching angle $A_1^-$. The switching angle $A_1^-$ occurs an amount of time $\Delta t^-$ before the unvaried switching angle $A_1$. The quantity $a_{n1\Delta}^-$ may be determined by integrating the product of the function $f(t)$ and $\cos(n\omega t)$, where $f(t)$ is equal to the DC link voltage during $\Delta t^-$ and is zero elsewhere, and where $\cos(n\omega t)$ has the frequency of the harmonic $n_1$ related to the switching angle $A_1$. This gives the value of $a_{n1\Delta}^-$ at the inverter output 28, prior to the filter 30. If the point of harmonic control is to be after the filter, then the phase and amplitude of the harmonics will be altered, by passage through the filter. This will cause the $a_{n1}$ and $b_{n1}$ coefficients after the filter to be a combination of the coefficients before the filters. These shifts must be taken into account in calculating whether the advanced or retarded switching angles will provide the better waveform quality. In other words, the product of $f(t)$ and $\cos(n\omega t)$ is integrated over $\Delta t^-$. If it is assumed that the function $f(t)$, i.e. the DC link voltage, is constant (except for harmonic ripple, which results in an error that can be ignored), the quantity $a_{n1\Delta}^-$ may be computed prior to system start up and may be treated as a constant. If the DC link voltage cannot be treated as a constant, then the DC link voltage must be sampled at the time of prediction and the quantity $a_{n1\Delta}^-$ must be determined by performing the integration in real time.

The quantity $a_{n1}^-$ is then determined by the following equation:

$$a_{n1}^- = a_{n1} + a_{n1\Delta}^-. \qquad (6)$$

The quantity $b_{n1}^-$ is determined in the same way except that the quantity $b_{n1}^-$ results from the integration of the product of $f(t)$ and $\sin(n\omega t)$ over $\Delta t^-$. Although the amount of time $\Delta t^-$ may be any desired amount of time, it is convenient to set $\Delta t^-$ equal to the lowest resolution unit by which the switching angles $A_1$–$A_{12}$ may be varied.

The second predictor 95 also predicts $a_{n1}^+$ and $b_{n1}^+$ by projecting the outputs from the integrators 84 and 86 along a standard sinusoidal waveform from the phase angle at which the prediction is made to the switching angle $A_1$ to determine $a_{n1}$, and by adding to $a_{n1}$ the harmonic content due to the incremental change in switching angle from the switching angle $A_1$ to the retarded (i.e., later) switching angle $A_1^+$.

That is, the first predictor 92 predicted the Fourier coefficient $a_{n1}$ as a result of not changing the switching angle $A_1$ in the subsequent cycle 72. The second predictor 95 predicts the incremental change in the Fourier coefficient $a_{n1}$, i.e. $a_{n1\Delta}^+$, which results if the switching angle $A_1$ is retarded to the switching angle $A_1^+$. The switching angle $A_1^+$ occurs an amount of time $\Delta t^+$ after the unvaried switching angle $A_1$.

The quantity $a_{n1\Delta}^+$ may be determined by integrating the product of the function f(t) and cos(nωt), where f(t) is equal to the DC link voltage during $\Delta t^{30}$ and is zero elsewhere, and where cos(nωt) has the frequency of the harmonic $n_1$ related to the switching angle $A_1$. In other words, the product of f(t) and cos(nωt) is integrated over $\Delta t^+$. Again, if it is assumed that the function f(t), i.e. the DC link voltage, is constant (except for harmonic ripple, which results in an error that can be ignored), the quantity $a_{n1\Delta}^+$ may be computed prior to system start up and may be treated as a constant. If the DC link voltage cannot be treated as a constant, then the DC link voltage must be sampled at the time of prediction and the quantity $a_{n1\Delta}^+$ must be determined by performing the integration in real time.

The quantity $a_{n1}^+$ is then determined by the following equation:

$$a_{n1}^+ = a_{n1} + a_{n1\Delta}^+. \qquad (6)$$

The quantity $b_{n1}^+$ is determined in the same way except that the quantity $b_{n1}^+$ results from the integration of the product of f(t) and sin(nωt) over $\Delta t^+$. Although the amount of time $\Delta t^+$ may be any desired amount of time, it is convenient to set $\Delta t^+$ equal to $\Delta t^-$.

The second predictor 95 determines the magnitude$^+$ and the phase$^+$ of the harmonic $n_1$ associated with the switching angle $A_1^+$ by inserting $a_{n1}^+$ and $b_{n1}^+$ into equations (4) and (5). The second predictor 95 also determines the magnitude$^-$ and the phase$^-$ of the harmonic $n_1$ associated with the switching angle $A_1^-$ by inserting $a_{n1}^-$ and $b_{n1}^-$ into equations (4) and (5).

A comparator 96 compares the predicted magnitude and the phase associated with the non-varied switching angle $A_1$, the predicted magnitude$^-$ and phase$^-$ associated with the varied (i.e., advanced) switching angle $A_1^-$, and the predicted magnitude$^+$ and phase$^+$ associated with the varied (i.e., retarded) switching angle $A_1^+$. The comparator 96 selects the magnitude/phase pair which is closest to the desired magnitude and phase for the harmonic $n_1$, and supplies the appropriate switching angle $A_1$, $A_1^+$, or $A_1^-$ associated with this selected pair to a controller 100. The controller 100 controls the transistors Q1 and Q2 at the appropriate switching angle.

Alternatively, instead of computing the predicted magnitude/phase associated with the unvaried switching angle $A_1$, the predicted magnitude$^+$/phase$^+$ associated with the retarded switching angle $A_1^+$, and the predicted magnitude$^-$/phase$^-$ associated with the advanced switching angle $A_1^-$ to determine which switching angle is to be supplied to the transistors Q1 and Q2, the predicted Fourier coefficients $a_{n1}/b_{n1}$, $a_{n1}^+/b_{n1}^+$, or $a_{n1}^-/b_{n1}^-$, may be simply compared by the comparator 96 to the desired values for $a_{n1}$ and $b_{n1}$ of the harmonic $n_1$. The comparator 96 would then supply the switching angle $A_1$, $A_1^+$, or $A_1^-$ associated with the $a_{n1}/b_{n1}$ pair closest to the desired $a_{n1}/b_{n1}$ pair to the controller 100. The controller 100 would then control the transistors Q1 and Q2 at the switching angle supplied to it.

A similar prediction and control methodology is implemented for each of the other controlled harmonics up through the $k^{th}$ harmonic. For example, if k is equal to 2, i.e. the second harmonic $n_2$, a multiplier 102 multiplies the signal f(t) on the output line 32 by a cosine function cos($n_2$ωt) having a frequency determined by k=2, i.e. the frequency of the second harmonic $n_2$. Similarly, a multiplier 104 multiplies the signal f(t) on the output line 32 by a sine function sin($n_2$ωt) having a frequency determined by k=2, i.e. the frequency of the second harmonic $n_2$. The integrator 106 integrates f(t)cos($n_2$ωt) beginning at the second switching angle $A_2$ of the present cycle 68, and the integrator 108 integrates f(t)sin($n_2$ωt) also beginning at the second switching angle $A_2$ of the present cycle 68.

The outputs from the integrators 106 and 108 are connected to a corresponding predictor 110. At a predetermined point in the sinusoidal waveform 66 before the sinusoidal waveform 66 reaches the switching angle $A_2$ in the subsequent cycle 72 of the sinusoidal waveform 66, the predictor 110 predicts what the Fourier coefficients $a_{n2}$ and $b_{n2}$ of the harmonic $n_2$ will be when the sinusoidal waveform 66 reaches the switching angle $A_2$ in the subsequent cycle 72.

Specifically, since the harmonic $n_2$ has the shape of a standard sinusoidal waveform, the predictor 110 predicts $a_{n2}$ and $b_{n2}$ by projecting the outputs from the integrators 106 and 108 along a standard sinusoidal waveform from the phase angle where it stops the integration process to the phase angle corresponding to the unvaried switching angle $A_2$ in the subsequent cycle 72.

Similarly, at the same predetermined point in the sinusoidal waveform 66 at which the predictor 110 predicts $a_{n2}$ and $b_{n2}$ for the unvaried switching angle $A_2$, a predictor 112 predicts $a_{n2}^-$ and $b_{n2}^-$ in the same fashion as the predictor 95 predicted $a_{n1}^-$ and $b_{n1}^-$; and, the predictor 112 predicts $a_{n2}^+$ and $b_{n2}^+$ in the same fashion as the predictor 95 predicted $a_{n1}^+$ and $b_{n1}^+$. The amount of time $\Delta t$ between the unvaried switching angle $A_2$ and the advanced switching angle $A_2^-$, and between the unvaried switching angle $A_2$ and the retarded switching angle $A_2^+$, is the same amount of time $\Delta t$ employed by the predictors 92 and 95.

A comparator 114 determines which pair of Fourier coefficients $a_{n2}/b_{n2}$, $a_{n2}^+/b_{n2}^+$, or $a_{n2}^-/b_{n2}^-$ is closest to zero, since it is desired to eliminate the harmonic $n_2$. The comparator 114 supplies the switching angle $A_2$, $A_2^+$, or $A_2^-$ associated with the pair of Fourier coefficients closest to zero to a controller 116. The controller 116 controls the transistors Q1 and Q2 at the switching angle supplied to it. Each controlled harmonic is similarly processed by a corresponding arrangement of multipliers, integrators, predictors, a comparator, and a controller.

After each switching angle $A_1$–$A_{12}$ is determined for the subsequent cycle 72 (assuming all switching angles are independently controlled), each pair of integrators is reset to zero and begins the integration of f(t)sin($n_k$ωt) and f(t)cos($n_k$ωt) at its corresponding switching angle in the subsequent cycle 72 so that the corresponding switching angle in a cycle later than the subsequent cycle 72 can be likewise determined, and so on.

Figure 5:
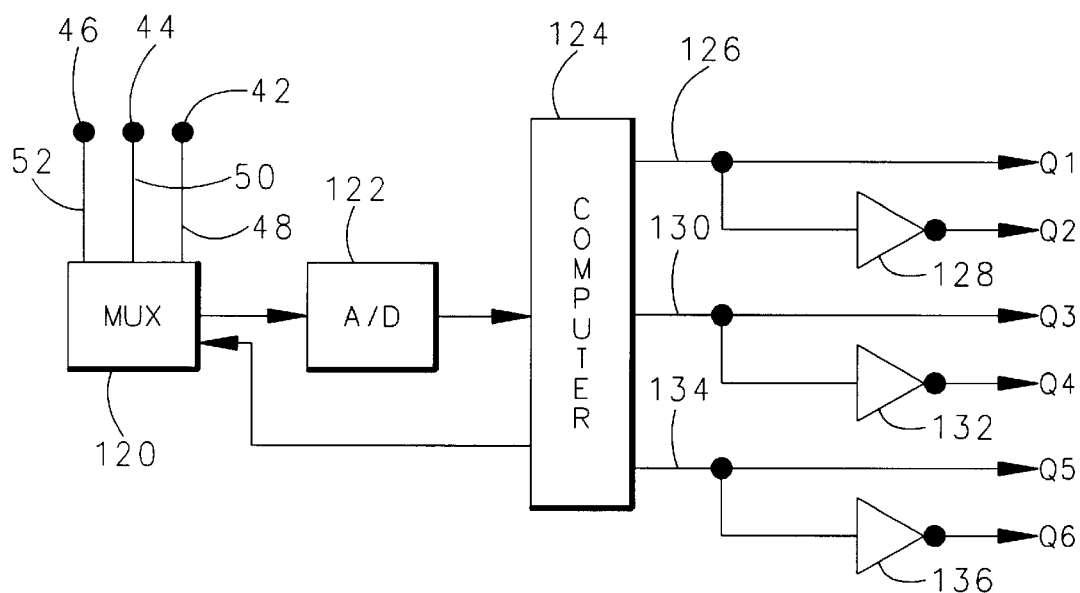
FIG. 5 illustrates another embodiment of the controller of FIG. 1.
Figure 6:
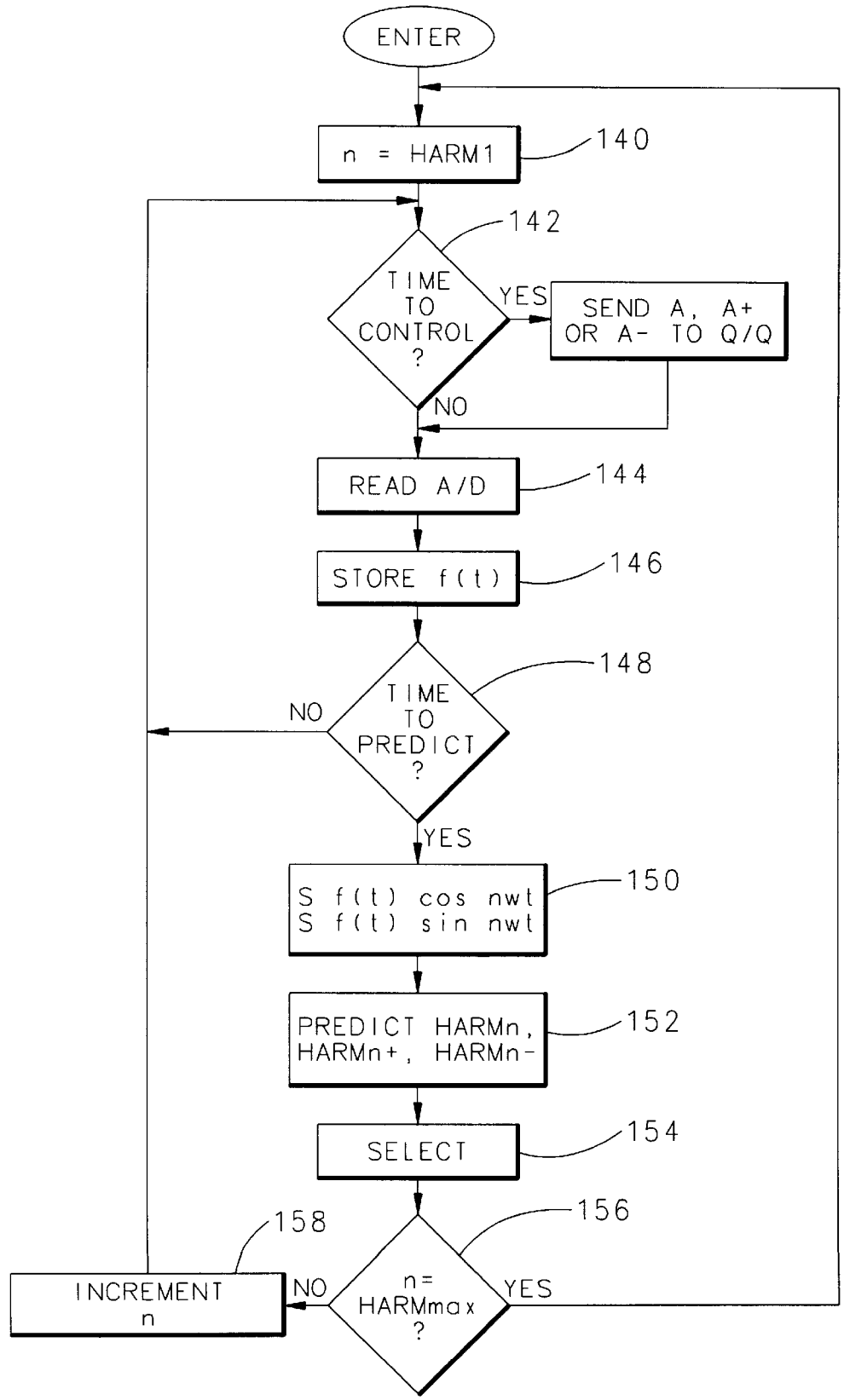
FIG. 6 illustrates a flow chart of a program, in accordance with the present invention, which can be implemented by the computer shown in FIG. 5.

In FIG. 5, a preferred embodiment of the controller 38 is shown. This embodiment includes a multiplexer 120 connected to the three sensing points 42, 44 and 46 by way of corresponding lines 48, 50, and 52. The output of the multiplexer 120 is connected to an A/D converter 122 which converts the analogue output from the multiplexer 120 into a digital format for processing by a computer 124. The computer 124 then provides an output 126 directly to the base of the transistor Q1, and to the base of the transistor Q2 through an inverter 128. Similarly, the computer 124 provides an output 130 directly to the base of the transistor Q3, and to the base of the transistor Q4 through an inverter 132; and, the computer 124 provides an output 134 directly to the base of the transistor Q5, and to the base of the transistor Q6 through an inverter 136. A flow chart of the program performed by the computer 124 for controlling the transistors Q1–Q6 is shown in FIG. 6. The flow chart as shown in FIG. 6 controls only one pair of transistors, it being understood that the computer 124 operates the multiplexer 120 to read the other two of the sensing points 42, 44, and 46 in order to control the other two pairs of transistors.

As shown in FIG. 6, a block 140 sets a variable n, representing the number of a harmonic to be controlled, to the first controlled harmonic. A block 142 then determines whether it is time to control a pair of transistors Q/Q at a selected switching angle. If the selected switching angle has not arrived, a block 144 reads the A/D converter 122, and a block 146 stores the signal on a corresponding output line 32, 34, or 36 in an appropriate block of memory. A block 148 determines whether it is time to predict the Fourier coefficients of the harmonic n. If it is not time, the program flow returns to block 142, 144, and 146 where it is determined whether it is time to control the transistor pair Q/Q and where the A/D converter 122 is again read and the function f(t) is again stored.

If it is time to predict the Fourier coefficients of the harmonic n, a block 150 integrates the product of that portion of the stored function f(t), which begins at the switching angle corresponding to the harmonic n, and the function cos(nωt), and also integrates the product of the same portion of the stored function f(t) and the function sin(nωt). A block 152 then predicts $HARM_n$, i.e. the Fourier coefficients of the unvaried harmonic n if the corresponding switching angle is not varied in the subsequent cycle, $HARM_n^+$, i.e. the Fourier coefficients of the varied harmonic n if the corresponding switching angle is advanced in the subsequent cycle by a predetermined amount, and $HARM_n^-$, i.e. the Fourier coefficients of the varied harmonic n if the corresponding switching angle is retarded in the subsequent cycle by the predetermined amount.

A block 154 then selects the switching angle associated with the most desirable of the predicted $HARM_n$, $HARM_n^+$, or $HARM_n^-$. The block also stores the selected switching angle associated with the most desirable of the predicted $HARM_n$, $HARM_n^+$, or $HARM_n^-$ for later use. For example, when n=HARM 1, the block 154 selects the switching angle producing the $HARM_n$, $HARM_n^+$, or $HARM_n^-$ which is closest to the predetermined magnitude and phase for the first harmonic. When n is other than HARM 1, the block 154 selects the switching angles producing the set of Fourier coefficients $HARM_n$, $HARM_n^+$, or $HARM_n^-$ which are closest to zero for these other harmonics.

At this point, a block 156 determines whether the variable n is equal to the harmonic number of the highest order harmonic to be controlled. If it is, the program flow returns to the block 140 where the variable n is again set to the first harmonic to be controlled and the process is repeated for a later cycle of the sinusoidal waveform 72. On the other hand, if the variable n is not equal to the harmonic number of the highest order harmonic to be controlled, a block 158 increments the variable n to the next harmonic to be controlled, and the program flow returns to the blocks 142, 144, and 146 where it is determined whether it is time to control the transistor pair Q/Q, and where the A/D converter 122 is again read and the function f(t) is again stored.

When the block 142 determines that it is time to control an appropriate pair of transistors Q/Q, i.e. the appropriate switching angle selected and stored by the block 154 has arrived, a block 160 sends an appropriate control signal to the transistor pair Q/Q. The program flow returns to the blocks 144 and 146. The program arrangement shown in FIG. 6 assures that the A/D converter 122 is periodically read so that the function f(t) is monitored throughout the cycles of the inverter 16 fundamental frequency.

Modifications of the present invention have been discussed above. Various other modifications and adaptations may be made by those skilled in the art without departing from the scope and spirit of the invention. Therefore, the present invention is to limited only by the following claims.

What is claimed is:

1. An inverter system comprising:

inverting means for inverting input DC power into output AC power having a fundamental frequency wherein the inverting means produces a variable width pulse, wherein the variable width pulse has a switching angle in a present cycle of the output AC power, and wherein the inverting means has an inverter signal;

integrating means for integrating, beginning at the switching angle in a present cycle of the output AC power, a product of the inverter signal and a sine function to produce a first integrated quantity wherein the sine function has a frequency of a harmonic of the fundamental frequency, and for integrating, beginning at the switching angle in the present cycle of the output AC power, a product of the inverter signal and a cosine function to produce a second integrated quantity wherein the cosine function has the frequency of the harmonic of the fundamental frequency;

predicting means, responsive to the integrating means, for predicting varied first and second integrated quantities in a subsequent cycle of the output AC power if the switching angle is varied, and for predicting unvaried first and second integrated quantities in the subsequent cycle of the output AC power if the switching angle is unvaried; and, means, connected to the inverting means and responsive to the predicting means, for controlling the inverting means so as to vary the switching angle in the subsequent cycle of the output AC power if the varied first and second integrated quantities are each closer to a desired level than are the unvaried first and second integrated quantities, and so as not to vary the switching angle in the subsequent cycle of the output AC power if the unvaried first and second integrated quantities are each closer to a desired level than are the varied first and second integrated quantities.

2. An inverter system comprising:

inverting means for inverting input DC power into output AC power having a fundamental frequency wherein the inverting means produces a variable width pulse, wherein the variable width pulse has a switching angle in a present cycle of the output AC power, and wherein the inverting means has an inverter signal;

integrating means for integrating a product of the inverter signal and a sine function to produce a first integrated quantity wherein the sine function has a frequency of a harmonic of the fundamental frequency, and for integrating a product of the inverter signal and a cosine function to produce a second integrated quantity wherein the cosine function has the frequency of the harmonic of the fundamental frequency;

predicting means, responsive to the integrating means, for predicting varied first and second integrated quantities in a subsequent cycle of the output AC power if the switching angle is varied, and for predicting unvaried first and second integrated quantities in the subsequent cycle of the output AC power if the switching angle is unvaried; and, means, connected to the inverting means and responsive to the predicting means, for controlling the inverting means so as to vary the switching angle in the subsequent cycle of the output AC power if the varied first and second integrated quantities are each closer to a desired level than are the unvaried first and second integrated quantities, and so as not to vary the switching angle in the subsequent cycle of the output AC power if the unvaried first and second integrated quantities are each closer to a desired level than are the varied first and second integrated quantities.

3. An inverter system comprising:

inverting means for inverting input DC power into output AC power having a fundamental frequency wherein the inverting means produces a variable width pulse, wherein the variable width pulse has a switching angle, and wherein the inverting means has an inverter signal;

integrating means for integrating, beginning in a present cycle of the output AC power, a product of the inverter signal and a sine function to produce a first integrated quantity wherein the sine function has a frequency of a harmonic of the fundamental frequency, and for integrating, beginning in a present cycle of the output AC power, a product of the inverter signal and a cosine function to produce a second integrated quantity wherein the cosine function has the frequency of the harmonic of the fundamental frequency;

predicting means, responsive to the integrating means, for predicting varied first and second integrated quantities in a subsequent cycle of the output AC power if the switching angle is varied, and for predicting unvaried first and second integrated quantities in the subsequent cycle of the output AC power if the switching angle is unvaried; and, means, connected to the inverting means and responsive to the predicting means, for controlling the inverting means so as to vary the switching angle in the subsequent cycle of the output AC power if the varied first and second integrated quantities are each closer to a desired level than are the unvaried first and second integrated quantities, and so as not to vary the switching angle in the subsequent cycle of the output AC power if the unvaried first and second integrated quantities are each closer to a desired level than are the varied first and second integrated quantities.

* * * * *